United States Patent [19]
Tsai

[11] Patent Number: 5,980,800
[45] Date of Patent: Nov. 9, 1999

[54] METHOD FOR MAKING A BRACKET OF A BRAKE LEVER

[76] Inventor: Shih Fan Tsai, P.O. Box 63-99, Taichung, Taiwan

[21] Appl. No.: 09/047,078

[22] Filed: Mar. 24, 1998

[51] Int. Cl.$^6$ .............................. B62L 1/00; F16M 13/02; B29C 39/30

[52] U.S. Cl. ..................... 264/138; 29/527.6; 164/69.1; 164/302; 164/303; 249/57; 249/59; 264/328.1

[58] Field of Search .......................... 74/473.13; 249/57, 249/59; 264/138, 328.1; 188/24.21; 164/69.1, 113, 262, 302, 303, 340, 460; 285/197, 366, 367; 29/527.6, 445, 463, 558

[56] References Cited

U.S. PATENT DOCUMENTS

| | | | |
|---|---|---|---|
| 1,422,108 | 7/1922 | Kukac | 249/57 |
| 2,134,749 | 11/1938 | Burt . | |
| 4,132,296 | 1/1979 | Evett . | |
| 4,624,487 | 11/1986 | Thalmann | 285/197 |
| 5,252,810 | 10/1993 | Trosch et al. . | |
| 5,429,012 | 7/1995 | Ikeda et al. . | |
| 5,697,650 | 12/1997 | Brown | 285/197 |
| 5,860,326 | 1/1999 | Lussier | 74/473.13 |

FOREIGN PATENT DOCUMENTS

| | | | |
|---|---|---|---|
| 55-28834 | 2/1980 | Japan | 264/138 |

*Primary Examiner*—Jill L. Heitbrink

[57] ABSTRACT

A method uses a mold for making a bracket of a brake lever device. The mold includes a mold cavity and a stem and a block extended inward of the mold cavity for forming the aperture and the orifice of a band of the bracket. A material is then injected into the mold cavity for forming a prototype of the bracket. The prototype is tapped for forming an inner thread in the aperture of the band, and is cut for forming the slot and the ear and for forming a C-shaped structure for the band. The ear has an oblong recess for engaging with a head of a fastener.

2 Claims, 3 Drawing Sheets

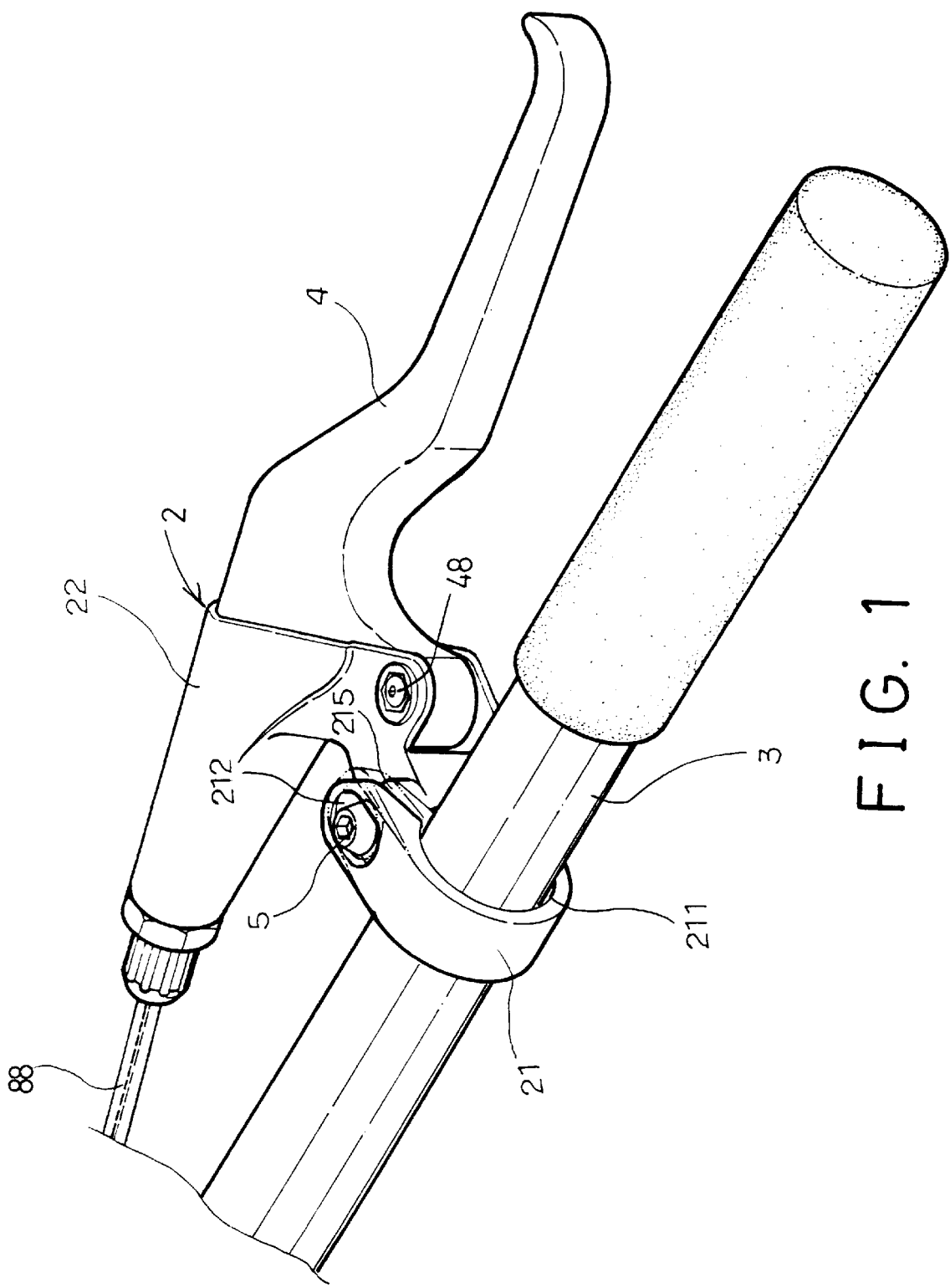

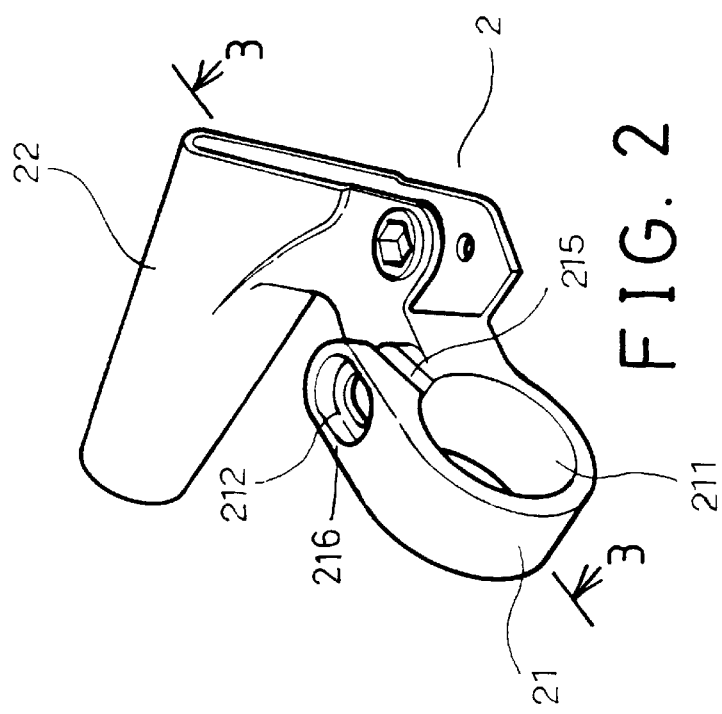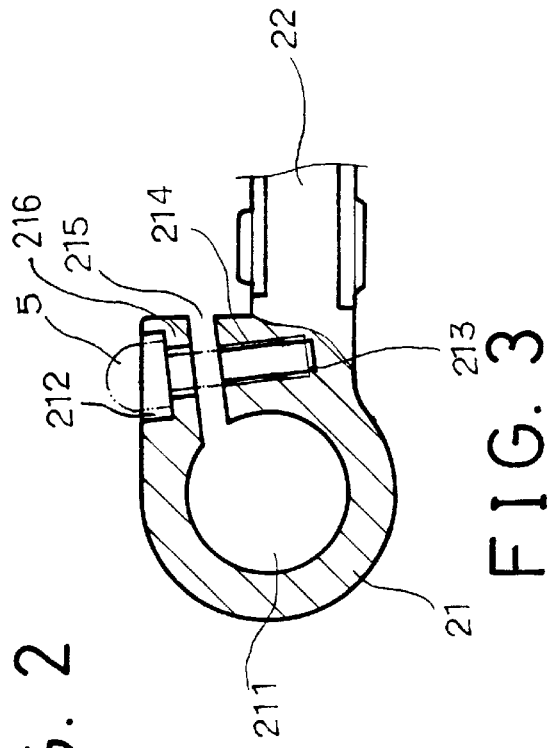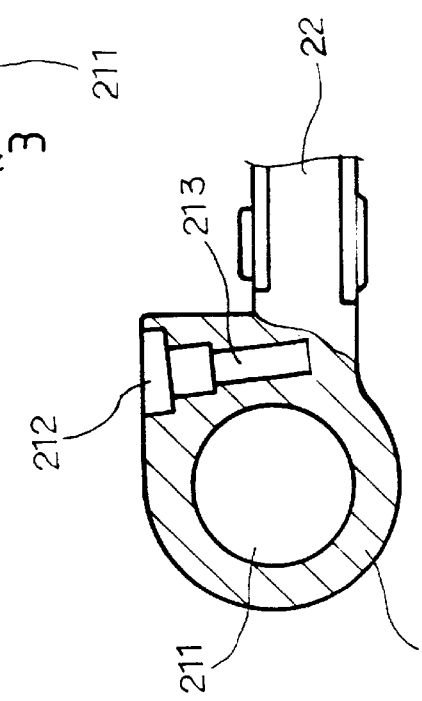

METHOD FOR MAKING A BRACKET OF A BRAKE LEVER

BACKGROUND OF THE INVENTION

1. Field of the Invention

The present invention relates to a method, and more particularly to a method for making a bracket of a brake handle of a brake lever.

2. Description of the Prior Art

Typical brake handles comprise a bracket having a C-shaped band for securing to a bicycle handle. The bracket is first required to be drilled with a hole and a tapping process is then required to form an inner thread in the hole for allowing the screw hole to engage with a threaded fastener. The band is then cut with a slot for forming the C-shaped structure of the band. The manufacturing processes are complicated. In addition, a porous structure may be formed in the bracket when the bracket is formed by casting process. When the bracket is drilled and tapped with the inner thread, the porosities formed in the bracket may be exposed and communicated with the screw hole and may greatly reduce the strength of the bracket. The working life of the bracket will thus be greatly reduced.

The present invention has arisen to mitigate and/or obviate the afore-described disadvantages of the conventional brake devices.

SUMMARY OF THE INVENTION

The primary objective of the present invention is to provide a method for making a bracket having a screw hole that is formed by a solid peripheral surface.

In accordance with one aspect of the invention, there is provided a method for making a bracket of a brake lever device, the bracket including a band having an orifice and having a slot for forming a C-shaped structure and having an ear, the band including an aperture intersecting with the slot, the method comprising providing a mold device having a mold cavity, the mold device including a stem and a block extended inward of the mold cavity corresponding to the aperture and the orifice of the band for forming the aperture and the orifice of the band, injecting a material into the mold cavity for forming a prototype of the bracket, tapping the prototype for forming an inner thread in the aperture of the band, and cutting the prototype for forming the slot and the ear.

The stem includes an enlarged portion for forming an oblong recess in the ear of the band.

Further objectives and advantages of the present invention will become apparent from a careful reading of a detailed description provided hereinbelow, with appropriate reference to accompanying drawings.

BRIEF DESCRIPTION OF THE DRAWINGS

FIG. 1 is a perspective view of a brake lever having a bracket formed by a method in accordance with the present invention;

FIG. 2 is a perspective view of the bracket to be formed by the method in accordance with the present invention;

FIG. 3 is a cross sectional view of the bracket, taken along lines 3—3 of FIG. 2;

FIG. 6 is a cross sectional view of the prototype of the bracket as shown in FIG. 4.

DETAILED DESCRIPTION OF THE PREFERRED EMBODIMENT

Figure 4:
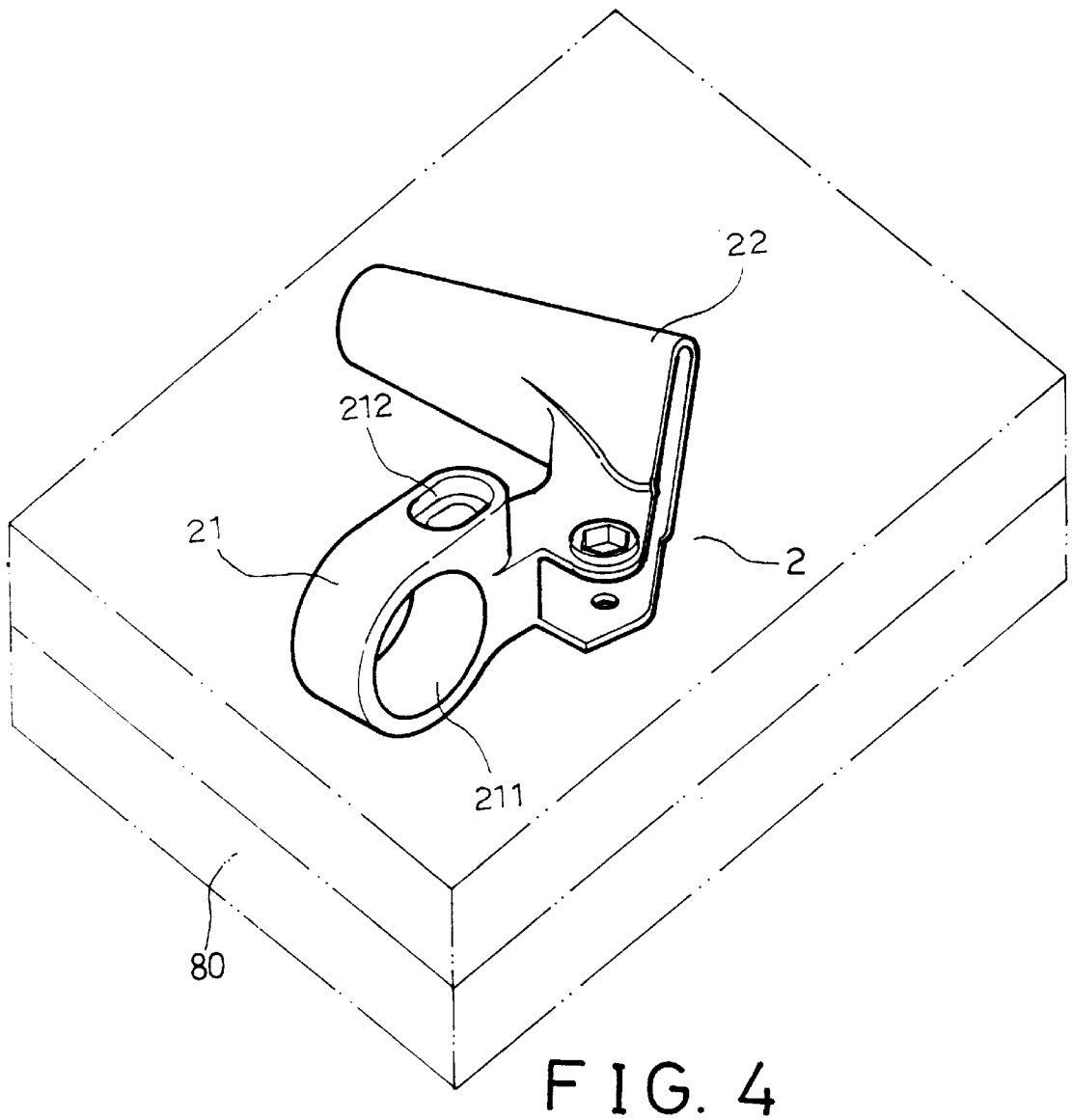
FIG. 4 is a perspective view illustrating the prototype of the bracket.

Referring to the drawings, and initially to FIGS. 1–3, a brake lever mechanism of a typical bicycle includes a bracket 2 and a brake handle 4 pivotally coupled to the bracket 2 at a pivot pin 48 for actuating a brake cable 80. The bracket 2 includes a nose cone 22 for engaging with the brake cable 88 and includes C-shaped band 21 having an orifice 211 for engaging with a handle 3 of the bicycle and having a slot 215 for defining an ear 216 and for allowing the ear 216 to be moved toward the bracket 2 by a fastener 5 for being secured to the handle 3. The bracket 2 includes an aperture 213 and an inner thread 214 for engaging with the fastener 5 and includes an oblong recess 212 for engaging with the head of the fastener 5. The provision of the oblong recess 212 allows the head 5 to be slightly moved along the oblong recess 212 when the ear 216 is moved toward or away from the bracket 2. The aperture 213 is intersected with the slot 215.

Figure 5:
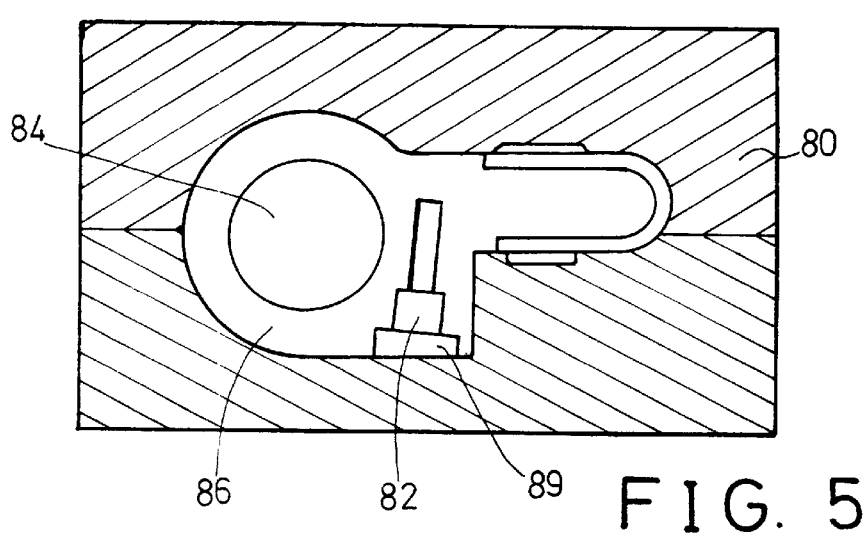
FIG. 5 is a cross sectional view illustrating the mold device for forming the bracket.

The method in accordance with the present invention is provided for forming the bracket 2. As shown in FIGS. 4–6, a mold device 80 is provided for forming the bracket 2 and includes a stem 82 and a block 84 extended inward of the mold cavity 86 of the mold device 80 corresponding to the aperture 213 and the orifice 211 of the band 21 respectively for forming the aperture 213 and the orifice 211 respectively. The stem 82 includes an enlarged portion 89 for forming the oblong recess 212. The prototype of the bracket 2 as shown in FIGS. 4 and 6 may thus be easily formed by injecting a material, such as plastic material or metal material or any other suitable material, into the mold cavity 86 of the mold device 80. The oblong recess 212 may also be directly formed in the casting or molding process. A tapping process is then actuated to form the inner thread 214 in the aperture 213. The prototype of the bracket 2 is then cut to form the slot 215 and to form the ear 216 in order to form the bracket 2.

It is to be noted that the aperture 213 and the oblong recess 212 and the orifice 211 may be easily and directly formed during the molding process, such that no further drilling and machining processes are required for machining the orifice 211 and the oblong recess 212 and the aperture 213. The aperture 213 may thus be formed by a solid peripheral surface. Only a tapping process and a cutting process are required for forming the bracket. In typical bracket, only a circular recess, corresponding to the oblong recess 212, may be formed in the bracket 2 for engaging with the head of the fastener 5 and includes a size equals to that of the head of the fastener such that the head of the fastener may not be moved in the typical circular recess and such that the head of the fastener may apply a great side force against the ear of the typical bracket and may thus easily damage the typical bracket.

Accordingly, the method in accordance with the present invention may be used for quickly making the bracket of the brake lever device and for forming an aperture in the band that is defined by a solid peripheral surface.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A method for making a bracket of a brake lever device, the bracket including a band having an orifice and having a slot for forming a C-shaped structure and having an ear, the band including an aperture intersecting with the slot, said method comprising:

providing a mold device having a mold cavity, said mold device including a stem and a block extended inward of said mold cavity corresponding to the aperture and the orifice of the band for forming the aperture and the orifice of the band, injecting a material into said mold cavity for forming a prototype of the bracket, the aperture and the orifice being formed in the prototype when the material is injected into said mold cavity, tapping the prototype of the bracket for forming an inner thread in the aperture of the band, and cutting the prototype of the bracket for forming the slot and the ear.

2. The method according to claim 1, wherein said stem includes an enlarged portion for forming an oblong recess in the ear of the band.

* * * * *